US012314242B2

(12) United States Patent
Rawal et al.

(10) Patent No.: US 12,314,242 B2
(45) Date of Patent: May 27, 2025

(54) DISTRIBUTED DATA STORAGE AND ANALYTICS SYSTEM

(71) Applicant: Elastic Flash Inc., Palo Alto, CA (US)

(72) Inventors: Darshan Bharatkumar Rawal, Fremont, CA (US); Naoki Iwakami, Redwood City, CA (US); Kalyan Seshu, Karnataka (IN); Prasanta Sahoo, Karnataka (IN)

(73) Assignee: Elastic Flash Inc., Palo Alto, CA (US)

( * ) Notice: Subject to any disclaimer, the term of this patent is extended or adjusted under 35 U.S.C. 154(b) by 0 days.

(21) Appl. No.: 17/979,936

(22) Filed: Nov. 3, 2022

(65) Prior Publication Data

US 2023/0054341 A1    Feb. 23, 2023

Related U.S. Application Data

(63) Continuation of application No. 16/688,063, filed on Nov. 19, 2019, now Pat. No. 11,507,558.

(30) Foreign Application Priority Data

Nov. 20, 2018   (IN) .............................. 201811043729

(51) Int. Cl.
    *G06F 16/30*   (2019.01)
    *G06F 16/23*   (2019.01)
    *G06F 16/27*   (2019.01)

(52) U.S. Cl.
    CPC .......... *G06F 16/2343* (2019.01); *G06F 16/27* (2019.01)

(58) Field of Classification Search
    CPC .......................... G06F 16/27; G06F 16/2343
    See application file for complete search history.

(56) References Cited

U.S. PATENT DOCUMENTS

| 7,069,325 | B1 | 6/2006 | Lu |
| 7,191,169 | B1* | 3/2007 | Tao ................... G06F 16/24539 707/999.102 |
| 10,649,759 | B1 | 5/2020 | Delange |
| 2002/0077997 | A1* | 6/2002 | Colby .................... G06F 16/22 |
| 2004/0024853 | A1 | 2/2004 | Cates |

(Continued)

OTHER PUBLICATIONS

"First Examination Report In IN Application No. 201811043729", Jan. 9, 2023, 6 Pages.

*Primary Examiner* — Khanh B Pham
(74) *Attorney, Agent, or Firm* — KPPB LLP (57) ABSTRACT

In some implementations, a computer-implemented method includes receiving a state update command. The method further includes, in response to the state update command, sending a command to perform a state update in a first server of a plurality of servers and queueing incoming requests for access to the plurality of servers. The method further includes receiving confirmation from the first server that the state update was successful. The method further includes, after receiving the confirmation, sending a respective command to the plurality of servers to perform the state update and a scheduled update time associated with the state update. The method further includes receiving a respective state update message from a subset of the plurality of servers that the state update was successful and after receiving the state update message, transmitting the queued incoming requests to the subset of the plurality of servers.

22 Claims, 5 Drawing Sheets

(56) References Cited

U.S. PATENT DOCUMENTS

| | | | |
|---|---|---|---|
| 2004/0225666 A1* | 11/2004 | Hinshaw | G06F 16/2393 |
| 2006/0047696 A1* | 3/2006 | Larson | G06F 16/24539 |
| 2008/0052701 A1 | 2/2008 | Abernethy | |
| 2013/0166515 A1* | 6/2013 | Kung | G06Q 10/063 |
| | | | 707/690 |
| 2016/0070556 A1 | 3/2016 | Baset | |
| 2020/0134683 A1* | 4/2020 | Boren | G06F 16/904 |
| 2020/0192571 A1* | 6/2020 | Thrane | G06F 3/0647 |

* cited by examiner

DISTRIBUTED DATA STORAGE AND ANALYTICS SYSTEM

RELATED PATENT APPLICATIONS

This application is a continuation of U.S. application Ser. No. 16/688,063, filed Nov. 19, 2019, entitled Distributed Data Storage and Analytics System, which claims priority to Indian Provisional Patent Application No. 201811043729, filed Nov. 20, 2018, entitled, Distributed Data Storage and Analytics System, both of which are incorporated by reference in their entirety.

BACKGROUND

Typical security procedures involve authentication of a device or user, e.g., based on a username and password combination, or other credentials) and tying it to roles defined via access control lists (ACLs) to determine the operations that a device or user can perform, e.g., data transfer operations. If device or user credentials are compromised, such procedures fail. For example, in deployments of Internet-of-Things (IoT) devices, a very large number of devices (e.g., millions of sensors) that send data may be outside a trusted perimeter of the enterprise (e.g., that receives data from such sensors and enables data analytics applications). Theft or other mechanisms that lead to such devices being connected to the enterprise with credentials that allow it to not just send data to the enterprise, but also allow it to extract data or perform administrative operations (e.g. delete data, etc.) can compromise security of enterprise data stores, e.g., distributed databases, and data customers, e.g., analytics applications, business logic applications that determine business parameters (e.g., pricing, manufacturing volume, etc.).

Further, distributed state update (in-memory or on persistence storage) of multiple servers (that may be geographically separated) is impossible to achieve without a lock. In typical distributed systems, a stored critical state is used to process data coming in from end devices (outside or within the network) and then have the data persisted. Updates to the stored critical state need to be performed in a manner that makes the state effective simultaneously across all the servers. Current distributed state update techniques do not include mechanisms to perform such update, and are error-prone.

When databases are utilized to receive and store data from various data sources (e.g., IoT sensors, point-of-sale systems, weblogs, clickstream data from browsers or mobile apps, etc.) such databases are configured to allow fast writes while sacrificing read operations. Such configuration limits the ability to perform real-time (or near real-time) analyses of data. Such analyses are valuable in many contexts, e.g., dynamic pricing or discounting, order fulfillment, etc. This problem is magnified when the databases are implemented in a distributed manner over multiple servers. Further, current databases that permit data analytics require data customers to develop custom code for analytical operations. Further, based on the type of analyses to be performed, such databases may also require expensive manual configuration of the distributed database and/or high costs to provide satisfactory performance.

Implementations described herein were conceived in the context of these problems.

SUMMARY

Some implementations relate to a computer-implemented method that includes receiving a state update command. The method further includes, in response to the state update command, sending a command to perform a state update in a first server of a plurality of servers and queueing incoming requests for access to the plurality of servers. The method further includes receiving confirmation from the first server that the state update was successful. The method further includes, after receiving the confirmation, sending a respective command to the plurality of servers to perform the state update and a scheduled update time associated with the state update. The method further includes receiving a respective state update message from a subset of the plurality of servers that the state update was successful and after receiving the state update message, transmitting the queued incoming requests to the subset of the plurality of servers.

In some implementations, the state update at the first server is persisted in a database hosted by the first server. In some implementations, the state update at the first server is performed without a change in a current effective state within the first server. In some implementations, the respective command instructs the plurality of servers to perform the state update at the scheduled update time.

In some implementations, the method further includes determining that no state update message was received from a second server of the plurality of servers. In these implementations, the method further includes, in response to determining that no state update message was received, sending a reboot command to the second server.

In some implementations, the plurality of servers are time synchronized. In some implementations, the incoming requests include requests to read data from a database hosted on the plurality of servers or requests to write data to a database hosted on the plurality of servers.

Some implementations relate to a computer-implemented method that includes receiving a request for an application binary from a device, wherein the request includes information about the device. The method further includes determining a device role of the device based on the information about the device and identifying code components based on the device role. The method further includes preparing the application binary based on the code components and delivering the application binary to the device.

In some implementations, the information about the device includes one or more of a device identifier, a device type, a network address of the device, a fingerprint, or a geographic location of the device. In some implementations, the request is received at a server via a dynamic handshake between the server and the device. In some implementations, the device role is one of ingest-only, ingest-and-extract, or administration.

In some implementations, identifying the code components is further based on code version or device-specific parameters.

In some implementations, preparing the application binary includes compiling the code components into executable code or an intermediate representation. In some implementations, the application binary is a library that can be incorporated into an application that executes on the device.

In some implementations, the method further includes receiving a data transfer request from the device, wherein the data transfer request includes credentials. In these implementations, the method further includes determining whether the device credentials match the device role. The method further includes, in response to determining that the device credentials match the device role, completing the data transfer request. The method further includes, in response to determining that the device credentials do not match the device role, rejecting the data transfer request.

Some implementations relate to a computer-implemented method that includes receiving a record from a data source at a server, wherein the record includes a plurality of fields. The method further includes processing the record in-memory at the server, wherein the processing includes performing data validation of the record including validation of bounds on at least one of the plurality fields in the record. The method further includes, after the processing, storing the record in a primary table of a database on a first server, wherein the record is associated with a primary key in the primary table that is unique to the record. The method further includes creating a view based on the primary table. In some implementations, the view has a different primary key than the primary key of the primary table and includes a subset of the plurality of fields such that at least one of the plurality of fields is excluded from the view.

In some implementations, processing the record further includes at least one of: appending other data to the record, performing format conversion of one or more fields in the record, or detecting an anomaly in the record.

In some implementations, the method further includes receiving a declaration that specifies the subset of the plurality of fields for the view. In some implementations, the declaration further specifies a refresh cycle for the view. In these implementations, the method further includes updating the view per the refresh cycle. In some implementations, the updating comprises synchronizing the view with the primary table.

In some implementations, the method further includes analyzing a query access pattern for the primary table. In these implementations, creating the view is based on the query access pattern indicating that the subset of fields are queried repeatedly in a particular period of time.

In some implementations, the primary table is stored on a storage device selected based on storage tiering parameters.

In some implementations, the method further includes storing the view on a second server different from the first server. In some implementations, the first server and the second server are time synchronized. In some implementations, the method further includes creating one or more additional views that include respective subsets of the plurality of fields and storing the one or more additional views on respective servers that are different from the first server and the second server.

Some implementations include a computing device comprising a hardware processor and a memory coupled to the hardware processor, with instructions stored thereon that, when executed by the hardware processor, cause the hardware processor to perform any of the methods described herein.

Some implementations include a non-transitory computer-readable medium, with instructions stored thereon that, when executed by a processor, cause the processor to perform any of the methods described herein.

DETAILED DESCRIPTION

Figure 1:
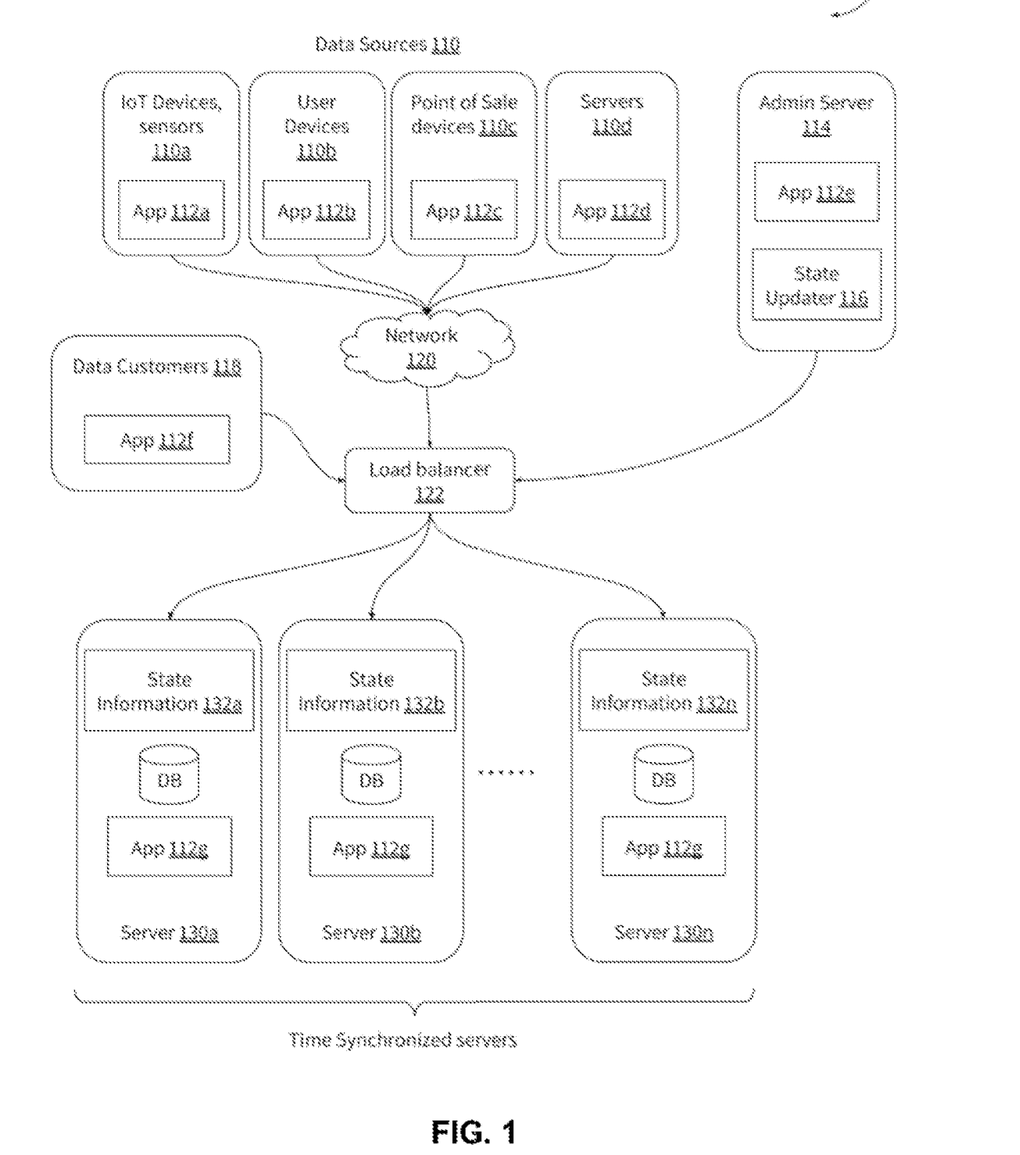
FIG. 1 is a block diagram of an example network environment which may be used for one or more implementations described herein.

FIG. 1 illustrates a block diagram of an example network environment 100, which may be used in some implementations described herein. Environment 100 includes data sources 110, one or more admin servers 114, data customers 118, and one or more load balancers 122, all coupled via network 120. Environment 100 also includes servers 130 that are coupled to load balancer 122.

Environment 100 may include one or more devices that act as sources of data. Data sources 110 may include, for example, Internet-of-Things devices or sensors 110a, user devices 110b (e.g., mobile phones, tablets, laptops, wearable devices, personal health devices, fitness trackers, etc.), point of sale devices 110c (e.g., in-store point of sale terminals), servers 110d (e.g., web servers that provide data such as clicks on particular web pages), etc. Devices 110a-110d are collectively referred to as data sources 110 henceforth.

Each of data sources 110 may be configured with a corresponding application 112. For example, IoT devices/sensors 110a may include app 112a, User devices 110b may include app 112b, PoS devices 110c may include app 112c, and servers 110d may include app 112d. Applications 112 may provide functionality for data generated by a data source 110 to be sent to a distributed database for storage. Applications 112 may also provide other functionality. In some implementations, an application 112 may include an application component, e.g., a library, provided by a third-party other than a developer of application 112. For example, the application component may be provided by a cloud computing vendor that provides data storage and/or analytics services. For example, the application component may be part of a software development kit (SDK) provided by the cloud computing vendor. Data sources 110 may be coupled to network 120.

In some implementations, data sources 110 may be configured with ingest capability. In these implementations, application 112 on a data source 110 may be configured to send data from the data source to one or more other devices via network 120. For example, such data may include sensor readings from sensor 110a, data obtained by user device 110b such as location information, user activity information (e.g., heart rate, websites visited, etc.), sales data from PoS device 110c (e.g., transaction records, payment method used for a transaction, SKUs of items purchased, etc.), or data from servers 110d (e.g., click data from a web server, logs from a firewall, data from cameras or image sensors including image metadata such as timestamps, location, etc., radar/LIDAR data, etc.).

Data sources 110 that are configured with ingest capability can utilize an application 112 to send data to servers 130. For example, application 112 may incorporate a portion of a software library provided by a cloud computing vendor that manages servers 130 to send data to servers 130.

Environment 100 may also include administration server 114. While FIG. 1 shows one administration server 114, different implementations may include one, two, or more administration servers. In some implementations, administration servers may be controlled by the cloud computing vendor. Administration server 114 may include a software application 112e and a state updater module 116.

Software application 112e may provide functionality to update state of one or more other devices in environment 100, e.g., servers 130, described below. In some implementations, application 112e may include one or more components that are provided by a cloud computing vendor, e.g., as part of an SDK. In some implementations, application 112e may incorporate a portion of the software library provided by the cloud computing vendor.

Environment 100 may further include data customers 118. For example, data customer 118 may include computing devices, e.g., reporting and analytics servers, that analyze data stored on servers 130. Reporting and analytics servers may execute software that analyzes data, including machine-learning algorithms, applications that include business logic to perform one or more actions based on the data, software utilized by data scientists to perform ad-hoc data analyses, etc. In some implementations, data customers 118 may be configured with a software application 112f In some implementations, application 112f may include one or more components that are provided by a cloud computing vendor, e.g., as part of an SDK.

Environment 100 may further include a load balancer 122. While a single load balancer is shown in FIG. 1, in different implementations, any number of load balancers (e.g., one, two, or more) may be utilized. Load balancer 122 may be configured to receive data transfer requests from data sources 110, data consumers 118, and administration server 114. Further, load balancer 122 may receive commands from administration server 114, e.g., commands from application 112e that are to be sent to one or more of servers 130. Further, load balancer 122 may also receive state update requests from state updater 116.

In some implementations, load balancer 122 may be configured to distribute load, e.g., data transfer requests, commands, state update requests, etc. over servers 130. For example, load balancer 122 may distribute load based on one or more objectives, e.g., a utilization rate of one or more of servers 130, a power consumption of one or more servers 130, etc. In some implementations, load balancer 122 may be configured to direct certain data transfer requests to specific subgroups of servers 130. For example, load balancer 122 may be configured to compute a hash value from one or more fields of a data transfer request from data sources 110 or data customers 118 to identify one or more of servers 130 that can fulfill the data transfer request. In some implementations, load balancer 122 may maintain a mapping between hash values and identities of servers 130, e.g., as a hashtable, and utilize the mapping to direct data transfer requests. In implementations where there are multiple load balancers 122, the hashtable may be a distributed hashtable. In some implementations, load balancer 122 may be configured to update the hashtable periodically, e.g., when one or more servers 130 goes offline, when an additional server 130 comes online, etc. In some implementations, the hashtable may indicate affinity between data transfer requests and one or more of servers 130.

Environment 100 may further include one or more servers 130, illustrated as servers 130a, 130b, and 130n. Any number of servers 130 may be utilized. As illustrated in FIG. 1, a server 130 may store data in a database (denoted "DB"). In some implementations, the database in each server 130 may be part of a distributed database, e.g., a database that stores data across a plurality of servers 130 in a distributed manner. In some implementations, data in the distributed database may be stored in a redundant manner, e.g., a single data value may be stored in two, three, or more servers 130. Such implementations may be beneficial, e.g., for data resiliency (in the event of failure of one or more servers 130), for performance (e.g., enabling data values to be read from or written to any of servers 130), etc. In some implementations, distributed databases such as Cloud BigTable or Cloud Spanner from Google Inc., Apache Cassandra, Amazon DynamoDB, etc. may be utilized to implement the database.

In some implementations, servers 130 may be physical servers (e.g., hardware computing devices) that are configured as distributed database servers, or virtual servers (e.g., virtual machines executing on hardware computing devices). In various implementations, the hardware that are utilized to implement servers 130 may be placed in a single data center (co-located), in multiple data centers (geographically distributed), etc. and may be coupled by a network, e.g., network 120 or other network.

In different implementations, servers 130 may be synchronized in time such that a local timestamp in each time-synchronized server 130 may be substantially identical to that in other servers 130 at any given instant. Time synchronization between servers 130 may be accomplished by any available techniques, e.g., network time protocol (NTP), Google TrueTime, or the like. In these implementations, the local timestamps in servers 130 may be utilized when writing data to the local portion of the distributed database, e.g., a timestamp may be stored in association with data values indicating the time at which the values were written to the database.

In some implementations, servers 130 include an application 112g. Application 112g may provide functionality for handling of data generated by a data source 110 and sent to a distributed database for storage. Application 112g may be utilized by servers 130 for the maintenance of state information 132a, 132b, . . . to 132n. Application 112g may also provide other functionality. In some implementations, application 112g may include an application component, e.g., a library, provided by a third-party other than a developer of application 112g. For example, the application component may be provided by a cloud computing vendor that provides data storage and/or analytics services. For example, the application component may be part of a software development kit (SDK) provided by the cloud computing vendor.

In some implementations, application 112g is utilized to handle data received by servers 130. For example, application 112g may incorporate a portion of a software library provided by a cloud computing vendor that manages servers 130 to receive data sent to servers 130.

In some implementations, one or more elements of environment 100 may be part of a data center (e.g., of a cloud computing provider), and other elements may be outside the data center. For example, as illustrated in FIG. 1, data sources 110 may be outside the data center, e.g., situated at geographic locations distinct from that of the data center. Such elements may be referred to as being outside the perimeter of the data center.

In some implementations, one or more elements, e.g., load balancer 122, servers 130 and/or administration server 114 may be within a single data center, or multiple data centers, e.g., managed by a cloud computing provider. A trusted perimeter may be defined within the data center or multiple data centers which houses elements that are relatively secure and protected from external threats. The security of such elements may arise from their physical location (e.g. low risk of access from hackers, intruders, etc.), the configuration of such elements, or combinations thereof. Such elements may be referred to as being within the trusted perimeter of the data center. The cloud computing provider may control the elements within the trusted perimeter of the datacenter, e.g., start/stop, reboot, disconnect from network, etc. while the cloud computing provider does not control elements outside the trusted perimeter.

The environment may also include various elements that lie outside the trusted perimeter. These may include third party devices (e.g. sensors, computers, etc.) and systems that communicate with elements within the trusted perimeter of the data center, and which may pose a higher security risk within the environment (e.g. sensors that may be stolen and/or reconfigured, third party hardware and software elements that may be hacked, etc.)

Figure 2:
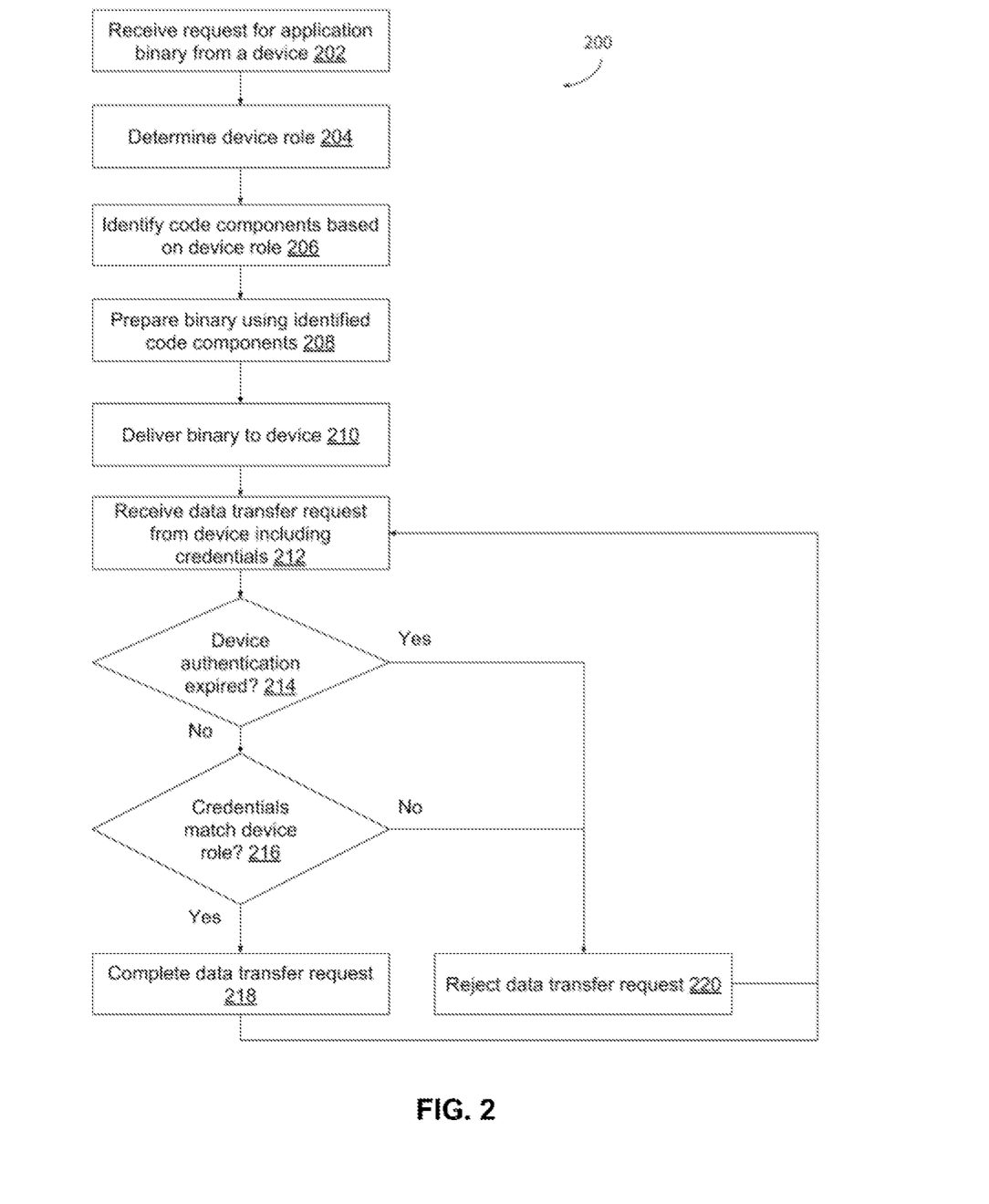
FIG. 2 is a flow diagram illustrating one example of a method to selectively deliver binary applications to a device and to selectively process data transfer requests based on device role and/or credentials, according to some implementations.

FIG. 2 is a flow diagram illustrating one example of a method 200 to selectively deliver binary applications to a device and to selectively process data transfer requests based on device role and/or credentials, according to some implementations.

In block 202, a request is received from a device for an application binary. The request may be received from a device that is a data source (for example, one or more of data sources 110 in FIG. 1), a device that is a data customer (for example, a device depicted as a data customer 118 in FIG. 1), or a device configured as an admin server (for example, device 114 illustrated in FIG. 1). The request may a request for access to a database to read from the database, write to the database, or perform both read/write operations. In some implementations, the request may include information about the device that requests the application binary. For example, such information may include a device identifier, a device type, a network address of the device, a fingerprint (e.g., a string hashed with a device key), a geographic location of the device, etc. In some implementations, a dynamic handshake may be performed between the device that requests the binary or attempts a data transfer request, and a server that handles the request from the device. In some implementations, the dynamic handshake may utilize a public/private key of the devices. The method proceeds to block 204.

In block 204, the information in the request is analyzed to determine a role for the device. For example, the device role may be "ingest-only" which indicates that the device is to be configured such that it can write data to servers 130 (e.g., to the distributed database) but not read data from servers 130. For example, data sources 110 may be configured as "ingest-only" devices. In another example, the device role may be "ingest and extract" which indicates that the device is to be configured such that it can write data to servers 130, and read data from servers 130. For example, data customers 118 may be configured in such a device role. In another example, the device role may be "administration" which indicates that the device is to be configured such that it can perform administrative operations for servers 130. For example, administration server 113 may be configured in such a device role. In some implementations, the roles may be hierarchical, e.g., a device in the "extract-and-ingest" role can perform all operations of the "ingest" role. The method proceeds to block 206.

In block 206, code components are identified based on the device role determined in block 204. In some implementations, other factors such as code version, device-specific parameters (e.g., device OS, processor type, capability to perform secure data transfer, etc.) may also be utilized in determining the code components. For example, code components (e.g., of the SDK) may be stored in a code library. For example, code components may correspond to device roles. The method proceeds to block 208.

In block 208, the code components identified in block 206 are utilized to prepare an application binary. For example, the code components may be compiled into executable code or an intermediate representation (e.g., bytecode). In some implementations, the application binary may be prepared as a library, e.g., that can be incorporated into an application 112 that executes on a device that requests the application binary. The method proceeds to block 210.

In block 210, the application binary is delivered to the device that sent the request received in block 202. For example, the application binary may sent over network 120. The method proceeds to block 212.

In block 212, a data transfer request, e.g., to write data to the distributed database, or read data from the distributed database, is received. In some implementations, the data transfer request may include credentials, e.g., of a user associated with the distributed database. For example, credentials may include login information, a security token, etc. The method proceeds to block 214.

At block 214, it is determined whether device authentication for the device has expired. If the device authentication has expired, the method proceeds to block 220. If the device authentication has not expired, the method proceeds to block 216.

At block 216, device credentials are verified and matched against a role for the device. In some implementations, device role information is provided by the device along with the data request. In some implementations, the device role may be associated with an identifier supplied by the device.

Upon successful verification of the device role (e.g. determination that the device credential matches the device role), the method proceeds to block 218 and the data transfer request from the device is processed, e.g., data from a data source is received and ingested, or data is provided to the device (e.g., a data customer). In some implementations, the data transfer may be facilitated by providing binaries that are specifically associated with the device role. For example, a sensor device that makes a data transfer request and is authorized to write data to the distributed database (authorized for ingest operation) may receive a binary that enables data write to the database. Similarly, a data analytics application authorized to extract data (authorized to query the database) may receive a binary that enable data read operations from the distributed database. The method proceeds to block 212 to receive a next data transfer request.

If verification of the device role fails, the method proceeds to block 220, and the data transfer request is rejected. For example, unsuccessful verification may be due to an incorrect or invalid credential provided by the device, due to a mismatch between device role and the type of request, etc. The method proceeds to block 212 to receive a next data transfer request. Repeated or multiple failures in device role verification may cause an alert to be raised, e.g., indicating that the device that attempted the data transfer request may be malicious, misconfigured, etc.

In different implementations, one or more blocks of the method of FIG. 2 may be combined, skipped, or performed in a different order. In some implementations, blocks 202-210 may be performed once to provide appropriate binary to a device, while blocks 212-220 may be performed multiple times once the device receives the binary. In some implementations, portions of method 200 may be performed by different servers, e.g., binary provision may be performed by a software validation/distribution server, while data transfers may be performed by a load balancer, a distributed database, or a combination. In some implementations, devices may be preconfigured with appropriate binaries by performing blocks 202-210 prior to shipping the device to a device user. In these implementations, data transfer requests may be handled by performing blocks 212-220.

Figure 3:
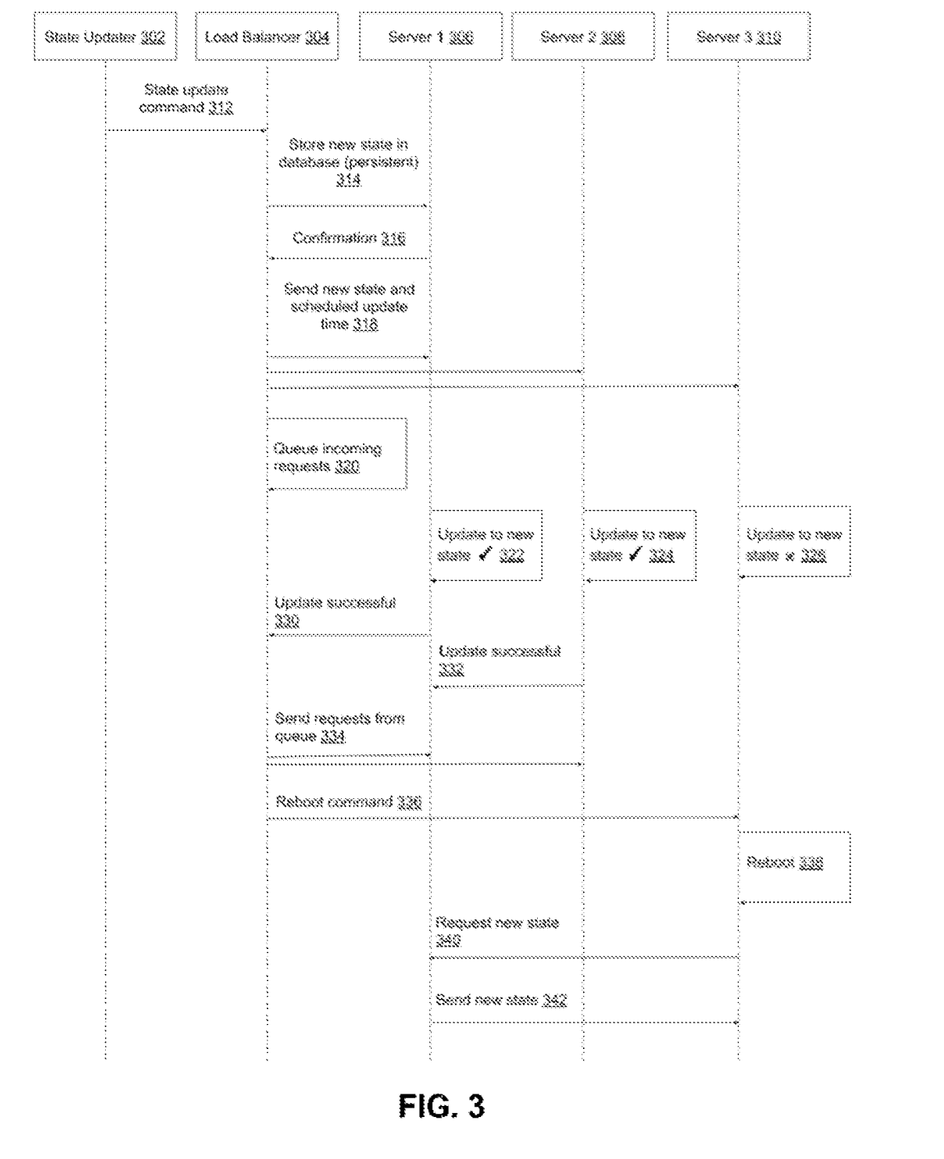
FIG. 3 illustrates time synchronized distributed state update of a plurality of servers, according to some implementations.

FIG. 3 illustrates time synchronized distributed state update of a plurality of servers, according to some implementations.

As illustrated in FIG. 3, state updater 302, load balancer 304, and server 1, server 2, and server 3 (306, 308, and 310) are deployed in an example setting. While three servers (e.g., servers 130 described with reference to FIG. 1) are illustrated in this example, there may be a greater or lesser number of servers deployed in various implementations.

In operation, state updater 302 may issue a state update command 312 to load balancer 304. The state update command may include a record associated with the state update. In some implementations, the record associated with the state update may be included in the state update command. In some implementations, the record associated with the state update and the state update may be sent as separate transmissions.

Upon receipt of the state update command, load balancer 304 may update the state within a first server (in this illustrative example, the state is updated in server 1 (306). In some implementations, the state update is persisted into the database by the server. In some implementations, state update performed in a plurality of servers, e.g., two or more servers, wherein the plurality of servers excludes one or more servers, e.g., 2 out of N servers, 3 out of N servers, etc. In some implementations, the update to the state within a server is performed without a change in a current effective state within that server, such that operation of the server does not take into account the updated state. Upon successful completion of the state update, server 1 (306) may provide a confirmation of successful completion 316 of the state update to load balancer 304.

Upon receipt of the confirmation, load balancer 304 sends (318) the new state and a scheduled update time to the N servers. In the example illustrated in FIG. 3, the new state and the scheduled update is sent to server 1 306 server 2 308 and server 3 310. In different implementations, load balancer may perform the send operation as a broadcast, multicast, or unicast operation. Further, load balancer 304 may queue incoming requests (e.g., data transfer requests or other state update requests) that are received until the scheduled update is completed (320).

Each server that receives the new state, e.g., server 1 (306), server 2 (308), and server 3 (310) (which are time synchronized) may perform state updates within their respective databases at the scheduled update time. In the illustrative example shown in FIG. 3, server 1 306 successfully updates to the new state (322) and server 2 308 successfully updates (324) to the new state, whereas server 3 310 fails (326) to update to the new state. For example, server 1 306 may change the effective state from a previous effective state to the state indicated in the state update command at the scheduled update time. Upon successful updates, server 1 (306) and server 2 (308) transmit respective messages (330 and 332) to load balancer 304 confirming that local state information has been successfully updated.

Upon receipt of a successful state update message from one or more servers, load balancer 304 may transmit (334) queued requests to the servers that indicated successful state updates. In some implementations, load balancer 304 may queue incoming requests until the receipt at load balancer 304 of confirmation of a successful state update from at least one of the servers. For example, incoming requests may be requests to read data from or write data to a database hosted on the one or more servers.

In some implementations, a reboot command may be sent (336) by load balancer 304 to a server from which a state update confirmation was not received by load balancer 304. Alternatively, a server that fails to perform the state update may be configured to reboot itself upon such failure. In the example illustrated in FIG. 3, a confirmation message associated with a state update is not received by load balancer 304 from server 3 310.

Upon reboot (338), server 3 310 may request a new state (340) from other servers, e.g., server 1 (306) or may retrieve such state from the local database, e.g., if the state value was stored previously in the local database (as described with reference to storing and confirmation steps 314 and 316). The new state is provided (342) by server 1 (306) or retrieved from local persistent database and may be utilized to configure the rebooted server 3 (310). Upon successful configuration with the new state, server 3 may be utilized to process data transfer requests.

Figure 4:
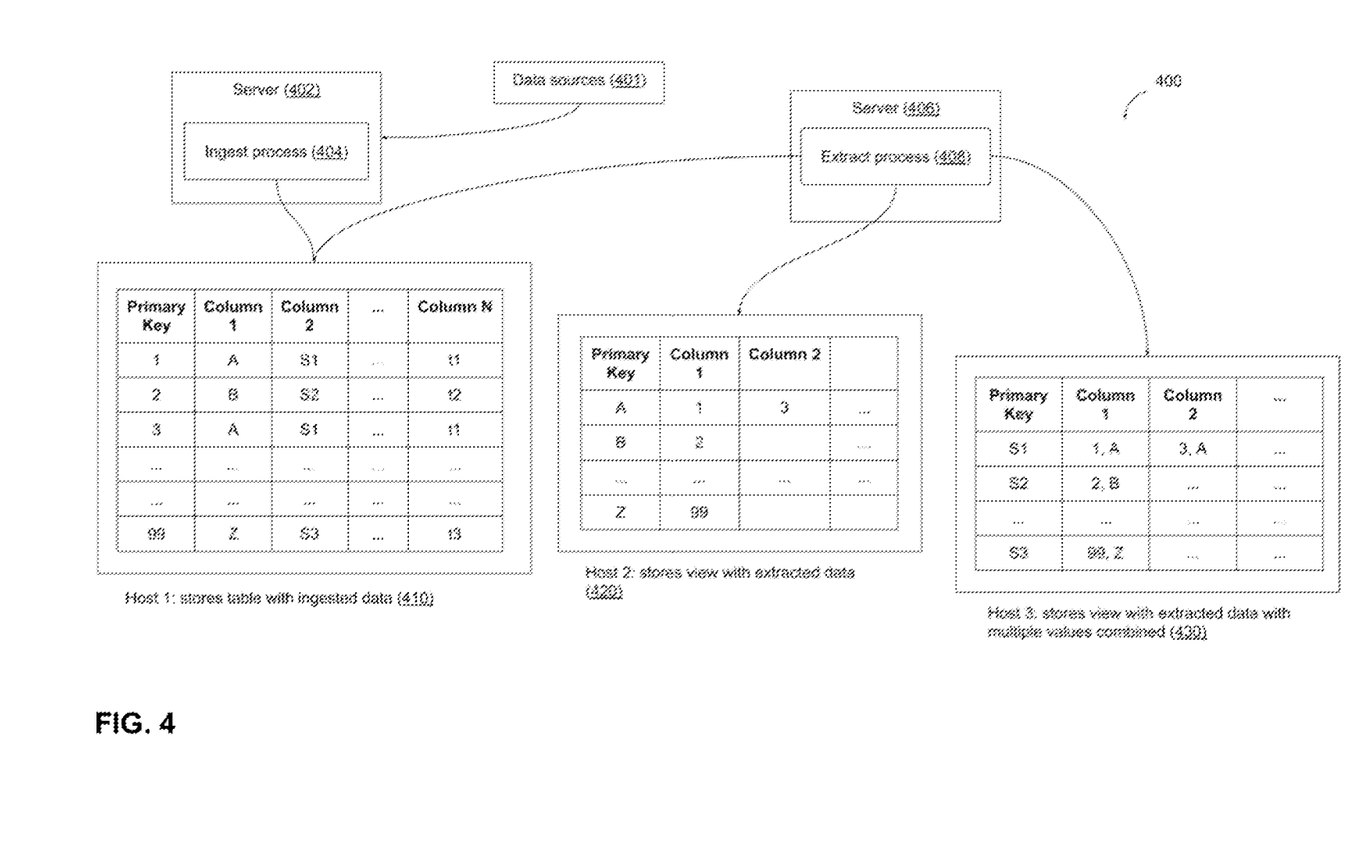
FIG. 4 illustrates an example environment with data ingest and extract processes, and storing of data in a distributed manner, according to some implementations.

FIG. 4 illustrates an example environment 400 with data ingest and extract processes, and storing of data in a distributed manner, according to some implementations.

It is appreciated that many data sources such as Internet of Things (IoT) sensors (e.g., home thermostats, industrial sensors, wearable sensors such as heart rate monitors, pedometers, etc.), online trackers (e.g., cookies, click-fraud detection tools, etc.) point-of-sale (PoS) systems, security software and hardware (e.g., intrusion detection software, smart locks, etc.) generate a large volume of data during operation. A very large number of such sensors has already been deployed and the number is growing rapidly. For example, such data can run into several petabytes per day.

When data is ingested from such sensors, e.g., for storage by one or more servers (e.g., cloud-based servers), some techniques attempt to implement optimizations that allow the data to be written fast while sacrificing read use cases. This problem is magnified when distributed databases (which rely on distributed hash-table principles as an anchor) are utilized to store such data. The lack of ability (or optimization) for read or search operations can be detrimental in many use contexts. For example, online stores benefit from real-time (or near real-time) data analyses that enable adjustment of pricing, discounts, warehouse management etc. In another example, online advertising providers, airlines, hotels, etc. that have rapidly diminishing inventory can benefit from quick information on purchase patterns and inventory. In another example, security functions such as intrusion detection or detection and remediation of denial-of-service attacks, are more effective when incoming data can be analyzed quickly. Implementations of data ingest and extract processes, as described with reference to FIG. 4, were conceived in light of at least some of these problems.

Data is received from data sources 401 by a server 402 that executes an ingest process 404. Data sources 401 may be any type of data sources, e.g., any of data sources 110. Data may be received over a network, e.g., via an upload from a data source 401. For example, a data source may send data periodically (e.g., once every 5 seconds, once every minute, etc.) or upon occurrence of certain events (e.g., a customer purchase transaction, an anomalous sensor reading, a detected security breach or suspicious activity, etc.). In another example, server 402 may request data from a data source 401, e.g., periodically, during a high availability period of server 402, etc. In different implementations, server 402 may provide an application programming interface (API) that may be utilized by a data source 401 to send data to server 402. For example, the API may allow data source 401 to indicate a type of one or more fields in the data, a periodicity with which the data source sends data, size of data being sent, reliability requirements for the data, etc. In some implementations, a software application or firmware that executes on data source 401 may incorporate a software development kit (SDK) component that enables data source 401 to send data to server 402.

Data received from a data source 401 is provided to an ingest process 404. Ingest process 404 may be implemented as a software application. In some implementations, ingest process 404 may be implemented via dedicated hardware, e.g., a field-programmable gate array (FPGA), an application specific integrated circuit (ASIC), a co-processor or accelerator, etc. Ingest process 404 receives the data and inserts the data into a primary table for storage. For example, the primary table may be stored on one or more hosts 410. For example, ingest process 404 may store data from a first data source in a first set of tables, data from a second data source in a second set of tables, and so on. In some implementations, a single host 410 may store the primary table from a particular data source. In different implementations, the primary table may be implemented as a set of tuples (rows) of a relational database structure, as key-value pairs, etc. Each tuple or key-value pair may correspond to a single data observation received from a data source. A single data observation may include any number of fields, e.g., one field (e.g., current temperature), two fields (e.g., current pressure and temperature) or more than two fields (e.g., current temperature, pressure, location, humidity level, etc.)

In some implementations, each data observation (record) received from a data source 401 may be assigned a primary key. In some implementations, the primary key may be assigned during the ingest process. In some implementations, the data source that sends the data may indicate a particular field that is to be used as a primary key during the ingest process. For example, FIG. 4 shows a primary key (values 1, 2, 3, . . . , 99). The primary key is unique to each tuple of the stored data.

Values of the fields received in the data observation (record) may be stored in columns of the primary table, e.g., columns 1, 2, . . . , N, as shown in FIG. 4. The number of columns may correspond to the number of fields in the data observation. In some implementations, ingest process 404 may include additional columns for other fields, e.g., timestamp, data source identifier, etc., in addition to the fields in the data observation.

In some implementations, the ingest process may perform validation of incoming data observations. For example, the ingest process may validate that the data observation includes an appropriate number of fields, that values for each field match a predefined data type for the field, etc.

In some implementations, data received from data sources is processed in memory of server 402 that executes the ingest process. In-memory processing can include any of several different types of operations. For example, in some implementations, in-memory processing includes validation of bounds on the received data values, e.g., confirming that data values are not missing, data is within predefined bounds (e.g., defined for a particular data source) etc. For example, predefined bounds for data from an in-home temperature sensor may specify a range of temperatures that correspond to an operational range for the sensor.

In some implementations, in-memory processing may include appending other data (e.g., contextually relevant data) to data received from a data source prior to writing the data to the primary table or performing view updates. For example, such contextual appends may include joining the IP address of the data source with geographic location information, joining a stock-keeping unit identifier (SKU) to a price field in the received data, etc. In some implementations, the contextual data may be cached in memory and persisted in the stored data. In some implementations, techniques described with reference to FIG. 3 may be utilized to ensure that contextual data is consistent across a plurality of servers that are utilized for data ingest, e.g., by utilizing the time synchronized update techniques to update contextual data cached or stored by the plurality of servers.

In some implementations, in-memory processing may include format conversion of data received a data source, e.g., from an inefficient format such as string to an efficient format such as enums. In some implementations, in-memory processing may include detection of anomalies in data values and provide warning or alarms to data customers, if necessary. For example, anomalies may be detected based on historical values, based on predefined valid range of values, variation in data values from the same data source over a period of time, etc. When in-memory processing is utilized, such processing may be carried out prior to inserting data into the primary table and updating views based on the data.

In some implementations, ingest process 404 may be implemented as a multithreaded process with different threads handling incoming data observations from different data sources, In some implementations, ingest process 404 may be implemented in a distributed manner, e.g., on a plurality of servers, which may be beneficial, e.g., when there are a large number of data sources 401, when data sources are geographically distributed, etc. For example, ingest process 404 may be implemented on multiple servers such that incoming data observations from geographically distributed data sources are ingested by a ingest process 404 that executes on a server that is physically proximate to the data source that provided the data observation. In some implementations, distributed implementations of ingest process 404 may be based on values of incoming data observations (e.g., partitioning by range of data values), by the rate at which data ingest requests are received, etc. In some implementations, additional servers that execute ingest process 404 may be spawned in response to an increase in the rate of data ingest requests. Implementation of ingest process 404 in this manner facilitates high velocity ingestion such that incoming data observations are inserted into the primary table (e.g., stored on host 410) without delay.

In some implementations, an extract process (408) may be executed on a server (406) concurrent with the ingest process 404. While a single extract process and server are shown in FIG. 4, it will be appreciated that any number of extract processes executing on a plurality of servers may be utilized, in a manner similar to ingest process 404 described above.

In some implementations, extract process 408 may be implemented as a software application. In some implementations, extract process 408 may be implemented via dedicated hardware, e.g., a field-programmable gate array (FPGA), an application specific integrated circuit (ASIC), a co-processor or accelerator, etc. Extract process 408 is configured to access hosts (e.g., host 1 410) that stores the primary table, generated by ingest process 404.

In some implementations, extract process 408 may be configured to create one or more views based on the primary table. Based on the application, extract process 408 may access the primary table during execution of the ingest process 404 (e.g., ingest process 404 may directly provide data observations to extract process 408; an insert into the primary table may trigger extract process 408, etc.), periodically (e.g., once a minute, once an hour, etc.), or in on-demand manner (e.g. when a view created by the extract process 408 is accessed).

Views created by extract process 408 may be accessible by various other applications. For example, a report generation application, a dashboard application, an analytics application, etc. may utilize an application programing interface (API) to access the views. In some implementations, such applications may utilize the API by incorporating one or more components of a software development kit (SDK).

In different implementations, views created by extract process 408 may be orthogonal to the primary table, e.g., have different primary key than the primary table. Further, the views can (optionally) duplicate one or more fields of the primary table, e.g., to facilitate fast reads, since any application that accesses the view can obtain the data directly, without accessing the primary table. In some implementations, a view may hold a reference to a primary data element (e.g., a tuple of the primary table), e.g., as shown in the view stored by host 2 (420). As shown in FIG. 2, the view stored on host 2 utilizes values from column 1 of the primary table as its primary key, and stores the corresponding identifiers (e.g., primary key values 1, 2, 3, . . . , 99) in columns of the view. Still further, a view may combine one or more values in different columns of the primary table into a single column. For example, the view stored by host 3 (430) utilizes values from column 2 of the primary table (S1, S2, . . . ) its primary key and combines the primary key and column 1 of the primary table into a single field (e.g., values in column 1 include "1,A", "2,B" etc.) In some implementations, a view may aggregate values (e.g., summing values, counting of values, etc. grouped by one or more fields) from a plurality of tuples of the primary table (not shown). In some implementations, derivations from one or more created views may be created as additional views.

Views created by extract process 408 may be stored on one or more servers. For example, FIG. 4 shows servers 420 and 430 that each hold a corresponding view generated by extract process 408. While single servers 420 and 430 are shown in FIG. 4, it will be appreciated that the views may be stored in multiple servers in a distributed manner, and may be partitioned based on application-specific context. For example, views by different dimensions (e.g., that utilize different fields as their primary keys) may be hashed to different servers.

In some implementations, extract process 408 may create views based on a specification provided by a customer application (e.g., a reporting application, analytics application, etc.) In these implementations, the SDK may provide a mechanism for the application to provide declarations corresponding to a view. For example, the declaration may specify fields of the primary table that are to be duplicated in the view, fields that are to be combined in the view, a refresh cycle for the view (e.g., real-time, periodic, or on-demand), etc. In some implementations, extract process 408 is implemented to analyze the declarations provided by a customer application to create the specified views.

In some implementations, extract process 408 may create views based on analysis of query access patterns that access data from the primary table or from one or more views. For example, such analysis may be performed using pattern-recognition techniques, machine-learning techniques, etc. In some implementations, extract process 408 may store a count of queries that hit the primary table or one or more views, and a corresponding list of fields for each query to enable detection of patterns. In some implementations, such stored information may be based on a particular period of queries, e.g., queries in the past hour, queries in the past day, queries in the past year, etc.

If it is determined based on the analysis that certain dimensions (fields) of the primary table are queried repeatedly (e.g., in a particular period of time), extract process 408 may automatically create a view that includes those dimensions, such that future queries may be served directly from the view, without accessing the primary table. In another example, if it is determined that certain primary tables (or fields) are queried within a very short interval of data ingest, extract process 408 may create a view in real-time and use multidimensional hashing (e.g., within a load balancer).

The query API provided to customers (e.g., for reporting and analytics applications) may be implemented such that customers can provide queries without an explicit reference to particular servers or stored data structures (e.g., primary table, views). In this manner, the complexity of back-end implementations of tables and views may be hidden from customers that access data.

In different implementations, automatic creation of views may not be performed, e.g., if the available servers are storage-constrained, incoming queries may be processed by accessing the primary table directly, even if the queries have recognizable patterns. Alternatively, when applications indicate that quick and up-to-data results to queries are important and when the corresponding server infrastructure is available, more views may be automatically created based on recognized query patterns. In different implementations, a threshold may be set for automatic creation of views based on available storage, query pattern, relative costs of serving a query from the primary table vs. a query-specific view, agreements with customer with respect to quality-of-service (e.g., response time or data freshness guarantees) for queries, etc.

In some implementations, data customers may specify a quality of service requirement, e.g., for one or more predefined queries, or for dynamically generated queries, and indicate a price per query that the data customer is willing to pay. In some implementations, data customers may indicate a query volume for data extract queries and a corresponding budget. Further, in some implementations, data customers may provide hints (e.g., via configuration settings, as part of queries, etc. Such customer-provided parameters may be utilized in determining whether to create one or more views, a refresh interval for the created views, etc.

In some implementations, further optimizations of the primary table may be performed. For example, ingest process 404 may determine, based on queries received via extract process 408 (e.g., to access the primary table to fulfill queries from a customer application or to create views) that certain columns are not utilized in queries (or are utilized infrequently). In these implementations, ingest process 404 may compact such columns of the primary table into a binary large object (BLOB) representation. Such conversion (or merging) of one or more columns of the primary table may change a schema-oriented field into a schemaless structure. Such conversion may reduce ingestion costs and/or storage costs to store such data. At a later time, if one or more of the fields in a BLOB representation are accessed repeatedly (in a pattern that meets a conversion threshold), such fields may be converted into columns of the primary table.

In some implementations, ingest process 404 and/or extract process 408 may utilize storage tiering when storing data for the different columns of the primary table and one or more of the views. For example, server 410 that stores the primary table or servers 420 and 430 that store different views may include different types of storage hardware, each with an associated cost. Such storage hardware may include, e.g., in-memory storage (e.g., data being stored in DRAM or SRAM), storage on high-speed hardware (e.g., 3D XPoint memory, flash memory, etc.), storage on hard disk drives, tape drives, etc. Further, a plurality of servers 410 may be utilized, each with a different cost and speed tradeoff (e.g., dedicated high-speed storage servers, lower cost servers, etc.). Storage tiering may be adjusted dynamically, e.g., based on rate of receipt of data observations from data sources 401, queries from customer applications, quality-of-service guarantees, and cost.

In some implementations, storage tiering may enable ingest process 404 and/or extract process 408 to perform age-based time-to-live on various elements of the primary table and/or views. For example, if the data observations correspond to point-of-sale (PoS) transactions, and a reporting application is determined to access data over the past 3 hours (in a rolling window fashion), data observations that are older than 3 hours may be moved to a lower-cost storage tier (e.g., from in-memory to flash, or from flash to hard disk driver storage) with a corresponding increase in the time necessary to respond to a query. In another example, columns of the primary table that are not used in queries may be stored on lower cost storage tiers after a particular time, while other columns may be retained on higher cost storage.

In different implementations, consistency of the views created by extract process 408 may be ensured by utilizing time-synchronized distributed state update techniques described with reference to FIG. 3 above. For example, such techniques may be utilized in periodic creation (or update) of views. In some implementations, multi-dimensional load balancer hashing may be utilized in real-time creation of views. In these implementations, the views may be created in real time, via the load balancer sending a first request to a first server (or set of servers) to hash data by one or more first dimensions, and a second request to a second server (or set of servers) to hash data by one or more second dimensions.

Determination of whether to proceed with the periodic creation of views or real-time creation of views may be performed using various mechanisms. For example, a time lag between an ingest operation that includes data that requires modification of a particular view and an extract operation (e.g., in response to an API call from a data customer) that accesses the view may be determined for such determination. If the time lag is lower than threshold, automatic creation and refresh of views may be performed in real-time, and otherwise, automatic creation and refresh may be performed periodically, e.g., in a batch manner.

The described techniques enable quick ingest of data (e.g., writes to the primary table) while also allowing for query or search operations to be performed simultaneously. By utilizing views that may be stored on servers different from the servers that store the primary table, the techniques can reduce or eliminate the performance impact that read operations have on write operations and vice-versa. Further, automatic creation of the primary table, automatic compacting of unutilized fields into BLOB storage, and automatic (or user-guided) creation of views reduces the burden on software developers (e.g., that develop reporting or analytics applications, or software for data sources) since such software can utilize the API provided by ingest process 404 and extract process 408, without needing to account for server-side implementation of tables and views.

While server (host) 410 is shown as storing the primary table and servers (hosts) 420 and 430 are shown as storing views that are illustrated in a tabular form, in different implementations, the primary table and/or the views may be sparse, e.g., different rows of the table or view may include different numbers of columns. Further, it will be understood that the data structures used to store the data may include database tuples (e.g., of a relational database), key-value pairs, or any other type of suitable data structure.

The described techniques provide distributed data storage with flexible data ingest and extract that enable selection of appropriate trade-offs of speed and cost for ingestion of data from data sources, data cleansing and validation, and data storage (including in tables and views that store data in different dimensions allowing for efficient queries and searches. Data ingest and extract as described with reference to FIG. 4 combines data creation and storage, and querying/searching into a single system, instead of different systems for the individual operations. Further, by flexibly (and automatically) creating views that match query patterns, and allowing customers to specify views by use of simple declarative statements, the techniques enable reporting and data analytics with low operating expense and minimal involvement from software developers.

Figure 5:
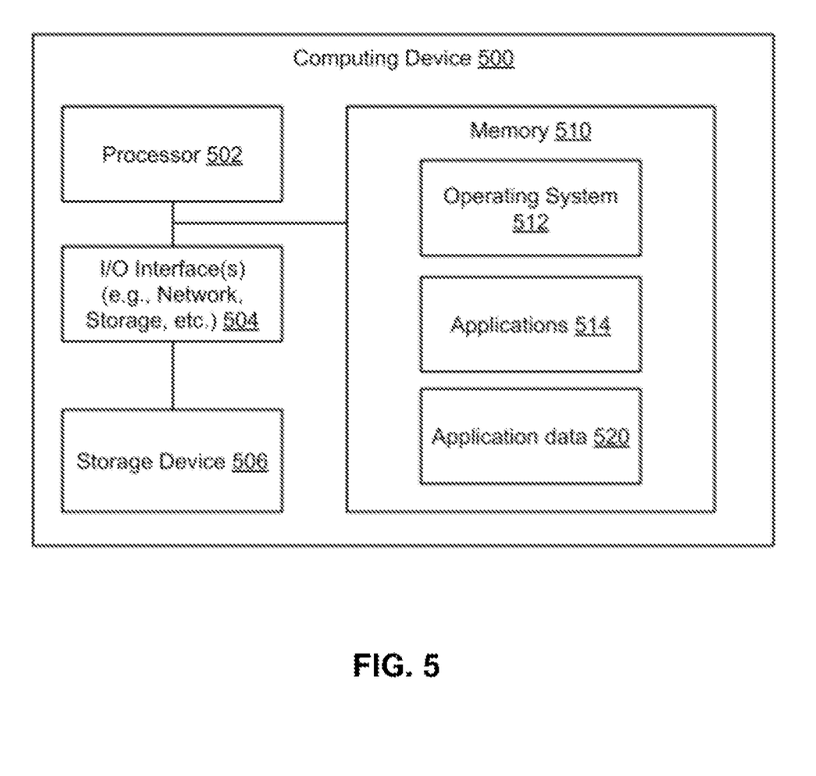
FIG. 5 is a block diagram of an example computing device which may be used to implement one or more features described herein.

FIG. 5 is a block diagram of an example computing device 500 which may be used to implement one or more features described herein. In one example, device 500 may be used to implement a computer device, e.g., a storage optimization device, and perform appropriate method implementations described herein. Device 500 can be any suitable computer system, server, or other electronic or hardware device. For example, the device 500 can be a mainframe computer, server computer, desktop computer, workstation, portable computer, or medical device. In some implementations, device 500 includes a processor 502, input/output (I/O) interface 504, one or more storage devices 506, and a memory 510.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 510 is typically provided in device 500 for access by the processor 502 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 510 can store software operating on the server device 500 by the processor 502, including an operating system 512, one or more applications 514, and application data 520. In some implementations, applications 514 can include instructions that enable processor 502 to perform the functions described herein, e.g., some or all of the methods of FIG. 2 and/or FIG. 3, and the functions described with reference to FIG. 4. Memory 510 also stores application data 520, e.g., ingested data, application code components, etc.

For example, applications 514 can include one or more applications that provide functionality to selectively deliver binary applications to a device and to selectively process data transfer requests based on device role and/or credentials, as described with reference to FIG. 2, time synchronized distributed state update of a plurality of servers, as described with reference to FIG. 3, and/or data ingest and extract and storing of data in a distributed manner, as described with reference to FIG. 5.

Any of software in memory 510 can alternatively be stored on any other suitable storage location or computer-readable medium. In addition, memory 510 (and/or other connected storage device(s)) can store other instructions and data used in the features described herein. Memory 510 and any other type of storage (magnetic disk, optical disk, magnetic tape, or other tangible media) can be considered "storage" or "storage devices."

In various implementations, applications 514 can include a machine-learning application. The machine-learning application may utilize Bayesian classifiers, support vector machines, neural networks, or other learning techniques. In some implementations, machine-learning application may include a trained model, an inference engine, and data. In some implementations, data may include training data, e.g., data used to generate trained model. For example, training data may include historical data on data extract patterns by one or more customer applications (e.g., reporting applications, data analytics applications, data-scientist guided data exploration or analysis applications, etc. Training data may be obtained from any source, e.g., a data repository specifically marked for training.

In some implementations, the machine-learning application excludes data. For example, in these implementations, the trained model may be generated, e.g., on a different device, and be provided as part of machine-learning application. In various implementations, the trained model may be provided as a data file that includes a model structure or form, and associated weights. The inference engine may read the data file for a trained model and implement a neural network with node connectivity, layers, and weights based on the model structure or form specified in the trained model.

Machine-learning application also includes a trained model. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data or application data, e.g., data extract patterns from a customer software application. Subsequent intermediate layers may receive as input output of nodes of a previous layer per the connectivity specified in the model form or structure. These layers may also be referred to as hidden layers. A final layer (e.g., output layer) produces an output of the machine-learning application, e.g., one or more view definitions for views to be created.

I/O interface 504 can provide functions to enable interfacing the computing device 500 with other systems and devices. For example, network communication devices, external storage devices, and other input/output devices can communicate via interface 504. In some implementations, the I/O interface 504 can connect to interface devices including input devices (keyboard, pointing device, touchscreen, microphone, camera, scanner, etc.) and/or output devices (display device, speaker devices, printer, motor, etc.).

Storage device 506 is one example of a storage device, e.g., a solid-state storage device, a hard disk drive, etc. that can be used by operating system 512 and/or one or more applications 514. Storage device 506 is a direct attached storage device, e.g., coupled to processor 502 and directly controlled by processor 502. Processor 502 is coupled to I/O interface(s) 504, storage device 506, and memory 510 via local connections (e.g., a PCI bus, or other type of local interface) and/or via networked connections.

For ease of illustration, FIG. 5 shows one block for each of processor 502, I/O interface 5046, storage device 506, and memory 510 with software blocks 512, 514, and 520. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. Any suitable component or combination of components of system 102 or similar system, or any suitable processor or processors associated with such a system, may perform the operations described, e.g., with reference to FIGS. 2 and 4.

A user device can also implement and/or be used with features described herein. Example user devices can be computer devices including some similar components as the computing device 500. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc.

The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (or GPUs) Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run in a web browser, a server application that executes on a single computer, a distributed application that executes on multiple computers, etc. In one example, a client/server architecture can be used, e.g., a mobile computing device (as a client device) sends user input data to a server device and receives from the server the final output data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
receiving a record from a data source at an ingest server, wherein the record includes a plurality of fields;
processing the record in memory at the ingest server, wherein the processing includes performing data validation of the record wherein performing the data validation includes
determining that the record includes an appropriate number of fields,
determining that data values of each of the plurality of fields match a predefined data type for the field, and
determining that the data value of a particular field of the plurality of fields in the record is within predefined bounds for the field, wherein the predefined bounds are defined for the data source and are specific to the data source;
after the processing, storing the record in a primary table of a database on a first storage server, wherein the record is associated with a primary key in the primary table that is unique to the record; and
creating a view based on the primary table;
updating the view automatically at a determined refresh cycle;

determining the refresh cycle by:
determining a time lag between the processing the record in memory at the ingest server and an operation that accesses the view;
setting the refresh cycle to be real-time when the time lag is lower than a threshold; and
setting the refresh cycle to be a periodic time interval when the time lag is not lower than the threshold.

2. The computer-implemented method of claim 1, wherein the view has a different primary key than the primary key of the primary table and includes a subset of the plurality of fields such that at least one of the plurality of fields is excluded from the view.

3. The computer-implemented method of claim 1, wherein processing the record further includes at least one of: appending other data to the record, performing format conversion of one or more fields in the record, or detecting an anomaly in the record.

4. The computer-implemented method of claim 1, further comprising receiving a declaration that specifies a subset of the plurality of fields for the view.

5. The computer-implemented method of claim 4, wherein the declaration further specifies a refresh cycle for the view, and the method further comprises:
updating the view per the refresh cycle.

6. The computer-implemented method of claim 5, wherein the updating comprises synchronizing the view with the primary table.

7. The computer-implemented method of claim 1, further comprising analyzing a query access pattern for the primary table, wherein creating the view is based on the query access pattern indicating that a subset of fields is queried repeatedly in a particular period of time.

8. The computer-implemented method of claim 1, wherein storing the record in the primary table of the database on the first storage server comprises storing the primary table on a storage device selected based on storage tiering parameters that specify a type of storage hardware for the storage device, and the method further comprises:
determining that a particular time has passed since storing the record in the primary table of the database on the first storage server; and
in response to determining that the particular time has passed, moving a first subset of columns of the primary table on a different storage device of a lower cost storage tier than the storage device, while columns of the primary table that are not in the first subset are retained on the storage device.

9. The computer-implemented method of claim 1, further comprising:
storing the view on a second storage server different from the first storage server, wherein the first storage server and the second storage server are time synchronized.

10. The computer-implemented method of claim 9, further comprising:
creating one or more additional views that include respective subsets of the plurality of fields; and
storing the one or more additional views on respective storage servers that are different from the first storage server and the second storage server.

11. The computer-implemented method of claim 1, wherein processing the record further includes detecting an anomaly in the record by detecting that the record includes at least one value that is outside a predefined valid range of values specific to the data source; and in response to detecting the anomaly, providing a warning to a data customer.

12. The computer-implemented method of claim 1, wherein the view has a different primary key than the primary key of the primary table, and the method further comprises:
storing the view on a second storage device of a second storage server different from the first storage server;
determining that a particular time has passed since storing the view on the second storage device of the second storage server; and
in response to determining that the particular time has passed, moving data observations of the view that are older than the particular time to a different storage device of lower cost storage tier than the second storage device.

13. The computer-implemented method of claim 1, wherein processing the record in memory at the ingest server further comprises:
Appending contextually relevant data from memory at the ingest server to the record prior to storing the record in the primary table.

14. The computer-implemented method of claim 1, further comprising:
determining based on received queries that certain columns of the primary table are used infrequently in queries; and
compacting the infrequently used columns into binary large object (BLOB) representation.

15. A computing device comprising:
a hardware processor; and
a memory coupled to the hardware processor, with instructions stored thereon that, when executed by the hardware processor, cause the hardware processor to perform operations comprising:
receiving a record from a data source at an ingest server, wherein the record includes a plurality of fields;
processing the record in server memory at the ingest server, wherein the processing includes performing data validation of the record, wherein performing the data validation includes
determining that the record includes an appropriate number of fields,
determining that data values of each of the plurality of fields match a predefined data type for the field, and
determining that the data value of a particular field of the plurality of fields in the record is within predefined bounds for the field, wherein the predefined bounds are defined for the data source and are specific to the data source;
after the processing, storing the record in a primary table of a database on a first storage server, wherein the record is associated with a primary key in the primary table that is unique to the record; and
creating a view based on the primary table;
updating the view automatically at a determined refresh cycle;
determining the refresh cycle by:
determining a time lag between the processing the record in memory at the ingest server and an operation that accesses the view;
setting the refresh cycle to be real-time when the time lag is lower than a threshold; and
setting the refresh cycle to be a periodic time interval when the time lag is not lower than the threshold.

16. The computing device of claim 15, wherein processing the record further includes at least one of: appending other data to the record, performing format conversion of one or more fields in the record, or detecting an anomaly in the record.

17. The computing device of claim 15, wherein the operations further comprise:
receiving a declaration that specifies a subset of the plurality of fields for the view.

18. The computing device of claim 15, wherein the operations further comprise analyzing a query access pattern for the primary table, wherein creating the view is based on the query access pattern indicating that a subset of fields are queried repeatedly in a particular period of time.

19. The computing device of claim 15, wherein the operations further comprise:
creating one or more additional views that include respective subsets of the plurality of fields; and
storing the one or more additional views on respective storage servers that are different from the first storage server.

20. A non-transitory computer-readable medium, with instructions stored thereon that, when executed by a processor, cause the processor to perform operations comprising:
receiving a record from a data source at an ingest server, wherein the record includes a plurality of fields;
processing the record in server memory at the ingest server, wherein the processing includes performing data validation of the record, wherein performing the data validation includes
determining that the record includes an appropriate number of fields,
determining that data values of each of the plurality of fields match a predefined data type for the field, and
determining that the data value of a particular field of the plurality of fields in the record is within predefined bounds for the field, wherein the predefined bounds are defined for the data source and are specific to the data source;
after the processing, storing the record in a primary table of a database on a first storage server, wherein the record is associated with a primary key in the primary table that is unique to the record; and
creating a view based on the primary table;
updating the view automatically at a determined refresh cycle;
determining the refresh cycle by:
determining a time lag between the processing the record in memory at the ingest server and an operation that accesses the view;
setting the refresh cycle to be real-time when the time lag is lower than a threshold; and
setting the refresh cycle to be a periodic time interval when the time lag is not lower than the threshold.

21. The non-transitory computer-readable medium of claim 20, wherein processing the record further includes at least one of: appending other data to the record, performing format conversion of one or more fields in the record, or detecting an anomaly in the record.

22. The non-transitory computer-readable medium of claim 20, wherein the operations further comprise receiving a declaration that specifies a subset of the plurality of fields for the view.

* * * * *